United States Patent
Theobald et al.

(10) Patent No.: US 9,077,227 B2
(45) Date of Patent: Jul. 7, 2015

(54) ELECTRIC MOTOR ASSEMBLY WITH ELECTRIC PHASING OF ROTOR SEGMENTS TO REDUCE BACK ELECTROMOTIVE FORCE

(75) Inventors: Mark A. Theobald, Bloomfield Hills, MI (US); Peter J. Savagian, Bloomfield Hills, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 709 days.

(21) Appl. No.: 13/354,452

(22) Filed: Jan. 20, 2012

(65) Prior Publication Data

US 2013/0187501 A1 Jul. 25, 2013

(51) Int. Cl.
*H02K 16/02* (2006.01)
*H02K 16/00* (2006.01)
*H02K 7/116* (2006.01)

(52) U.S. Cl.
CPC ............... *H02K 16/00* (2013.01); *H02K 7/116* (2013.01); *H02K 16/02* (2013.01)

(58) Field of Classification Search
USPC .......................................... 310/191, 209, 114
IPC ............................................. H02K 16/02,16/00
See application file for complete search history.

(56) References Cited

U.S. PATENT DOCUMENTS

| | | | |
|---|---|---|---|
| 4,578,609 A * | 3/1986 | McCarty | 310/156.24 |
| 5,680,837 A | 10/1997 | Pierik | |
| 6,462,430 B1 * | 10/2002 | Joong et al. | 290/40 C |
| 6,563,246 B1 * | 5/2003 | Kajiura et al. | 310/162 |
| 6,577,022 B2 | 6/2003 | Joong et al. | |
| 6,833,646 B2 | 12/2004 | Joong et al. | |
| 7,387,586 B2 | 6/2008 | Raghavan et al. | |
| 2008/0100168 A1 * | 5/2008 | Bremner | 310/162 |
| 2010/0064997 A1 | 3/2010 | Ai | |
| 2010/0107632 A1 | 5/2010 | Wu et al. | |
| 2010/0207471 A1 | 8/2010 | Hendrickson et al. | |

OTHER PUBLICATIONS

Caricci, Permanent Magnet, Direct-Drive, Starter/Alternator Machine with Weakened Flux Linkage for Constant-Power Operation Over Extremely Wide Speed Range, 2001 Institute of Electrical & Electronics Engineers, Inc. (IEEE), 0-7803-7116-X/01, pp. 1626-1633.

Xiaolan Ai, Matthew Wilmer and Donald Remoski, Electric Variable Cam Phase Shifter for Internal Combustion Engine, SAE Technical Paper Series 2008-01-1351, Apr. 14-17, 2008, SAE International Warrendale PA.

* cited by examiner

Primary Examiner — Dang Le
(74) Attorney, Agent, or Firm — Quinn Law Group, PLLC (57) ABSTRACT

An electric motor assembly includes a stator having a first set of electrical windings. The motor assembly includes a rotor assembly rotatable about an axis of rotation and that has a rotor with first and second rotor segments. Each of the rotor segments has a respective set of magnets spaced therearound. The motor assembly has a phaser that includes a phaser actuator and a phaser gear mechanism. The phaser gear mechanism has a plurality of members. The phaser actuator and the first and second rotor segments are each operatively connected to a different respective one of the members. The phaser actuator is activatable to change an angular position of the member to which the phaser actuator is operatively connected, moving one of the rotor segments about the axis of rotation relative to the other of the rotor segments to reduce back electromotive force in the first set of stator windings.

19 Claims, 5 Drawing Sheets

ELECTRIC MOTOR ASSEMBLY WITH ELECTRIC PHASING OF ROTOR SEGMENTS TO REDUCE BACK ELECTROMOTIVE FORCE

TECHNICAL FIELD

The invention relates to an electric motor assembly.

BACKGROUND

Some electric motor/generators are referred to as permanent magnet motors. Such motors have a stator with windings carrying three-phase alternating current that creates an electromotive force to turn a rotor that has permanent magnets. At the same time, the rotating magnetic fields of the permanent magnets generate a "back electromotive force" (EMF) in the windings. The so-called back electromotive force is a voltage opposing the voltage in the stator windings. The magnetic field strength and back electromotive force acting on each phase of the stator winding varies sinusoidally with the rotational position of the rotor. The average value of the back electromotive force is proportional to the rotational speed of the rotor. At low speed conditions, the voltage produced within the windings by the back electromotive force is relatively low, and the back electromotive force will be insignificant in comparison to the input voltage. At high output speed, the voltage produced within the windings by the back electromotive force is relatively high, and significant in comparison to the maximum voltage that can be applied to the windings, so that little or no current will flow in the windings without reduction of the magnetic field of the rotor.

Typically, a field weakening current is applied to the stator windings to suppress the magnetic field and back electromotive force so that torque-producing current will flow or flow more freely through the windings at high rotor speeds. Mechanical reduction of back electromotive force, especially during high speed conditions, could significantly improve the efficiency of the motor/generator by reducing or eliminating the need for field-weakening currents through the stator windings, so that all currents flowing through the stator windings are for the production of torque and therefore useful work.

SUMMARY

By dividing the rotor of a radial-flux motor into axial portions or segments, each having a set or sets of permanent magnets, and at least one of which can move (i.e., be skewed or phased) about the axis of rotation relative to the others, the magnets will be offset from one another by an increasing amount as the common rotational speed of the rotor portions increases. Offsetting the magnets from one another reduces the amplitude of the sinusoidal variation in magnetic field strength and back electromotive force generated by the rotating magnets. The reduction in back electromotive force allows reduction or elimination of the field weakening currents that must be applied and therefore increases motor efficiency.

An electric motor assembly is provided that includes a stator having a first set of electrical windings. The motor assembly includes a rotor assembly that is rotatable about an axis of rotation and has a rotor with first and second rotor segments. Each of the rotor segments has a respective set of magnets spaced therearound. The motor assembly has a phaser that includes a phaser actuator and a phaser gear mechanism. The phaser gear mechanism has a plurality of members. The phaser actuator and the first and second rotor segments are each operatively connected to a different respective one of the members. The phaser actuator is activatable to change an angular position of one of the members, thereby moving one of the rotor segments about the axis of rotation relative to the other of the rotor segments to reduce back electromotive force in the first set of stator windings.

In one embodiment, the phaser actuator has a phaser rotor and a phaser stator surrounding the phaser rotor. The phaser stator has a second set of electrical windings and causes a change in an angular position of the phaser rotor when the second set of electrical windings is powered (i.e., when electric current flows to the windings of the phaser stator). At least one of the rotor segments is operatively connected to the phaser rotor and is configured to move about the axis of rotation relative to the other of the rotor segments when the angular position of the phaser rotor changes.

In one embodiment, the motor assembly may include a first shaft, with the phaser rotor operatively connected to the first shaft to cause a change in angular position of the first shaft when the angular position of the phaser rotor changes. A second shaft is grounded to a stationary member such as a motor casing and is axially aligned with the first shaft.

The members of the phaser gear mechanism may include a first sun gear member mounted on and movable with the first shaft, a second sun gear member mounted on the second shaft, a first ring gear member mounted on and rotatable with the first rotor segment, a second ring gear member mounted on and rotatable with the second rotor segment, a carrier member, a first set of pinion gears supported by the carrier member and meshing with the first sun gear member and the first ring gear member, and a second set of pinion gears supported by the carrier member and meshing with the second sun gear member and the second ring gear member.

The above features and advantages and other features and advantages of the present invention are readily apparent from the following detailed description of the best modes for carrying out the invention when taken in connection with the accompanying drawings.

DETAILED DESCRIPTION

Figure 1:
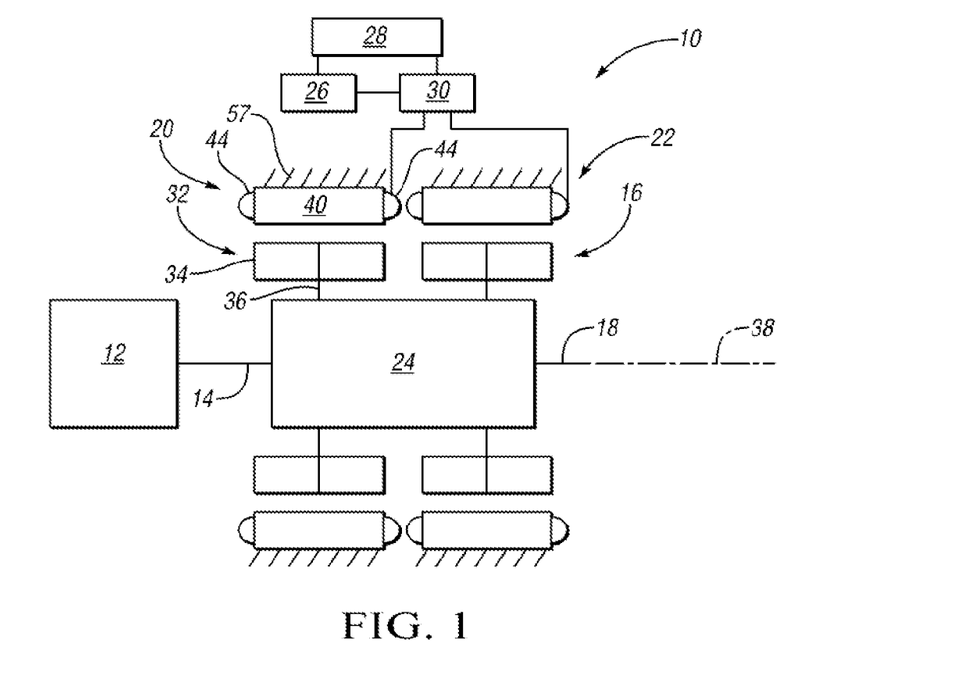
FIG. 1 is a schematic illustration of a first embodiment of a powertrain having an electric motor assembly within the scope of the invention.

Referring to the drawings, wherein like reference numbers refer to like components throughout the several views, FIG. 1 shows an example of a powertrain 10 that includes an engine 12 operatively connected to an input member 14 of a transmission 16 to provide power at an output member 18 of the transmission 16. The powertrain 10 may be a vehicle powertrain, with the output member 18 connected to vehicle wheels (not shown) to provide tractive force at the wheels. The transmission 16 is an electromechanical hybrid transmission with two electric motor assemblies 20, 22 connected to different members of a gearing arrangement 24 included in the transmission 16. The electric motor assemblies 20, 22 are referred to herein as motor/generators 20, 22, as they may be controlled by a controller 26 to be operated as either motors or generators in various modes of operation of the transmission 16. Within the scope of the claimed invention, a powertrain may alternatively have only one motor/generator.

The controller 26 is connected to an energy storage device, such as a battery 28, and controls the flow of power from the battery 28 to one or both of the motor/generators 20, 22 through a power inverter 30 when the motor/generator 20 and/or 22 operates as a motor, and controls the flow of power from one or both of the motor/generators 20, 22 to the battery 28 via the power invertor 30 when the motor/generator 20 and/or the motor/generator 22 is controlled to operate as a generator.

The motor/generators 20, 22 are substantially similar in structure and design. Accordingly, motor/generator 20 is described in further detail, and the description applies equally to motor/generator 22. Motor/generator 20 has a rotor assembly 32 that includes a rotor 34 mounted on a rotor hub 36 that is operatively connected to a member of the gearing arrangement 24 such that the rotor assembly 32 is rotatable about an axis of rotation 38, which in this embodiment is the same as the axis of rotation of the input member 14 and the output member 18. The rotor 34 is a permanent magnet rotor that has sets of magnets distributed about its circumference, as further described herein and shown in FIGS. 2 and 3.

In order to reduce back electromotive force that occurs with permanent magnet-type rotors, the rotor hub 36 and the rotor 34 are each divided into multiple axial portions and are configured to allow at least one of the portions to be phased relative to the others, as further described herein. The motor/generator 20 also has a stator 40 that is mounted to a stationary (i.e., nonrotating) member, such as a casing 57 of the motor/generator 20 or of the transmission 16. Electrical windings 44 extend between the two axial ends of the stator 40. As used herein, the electrical windings 44 are a first set of electrical windings. Power from the battery 28 is provided to the windings 44 by the power inverter 30 as alternating current under the control of the controller 26.

Figure 3:
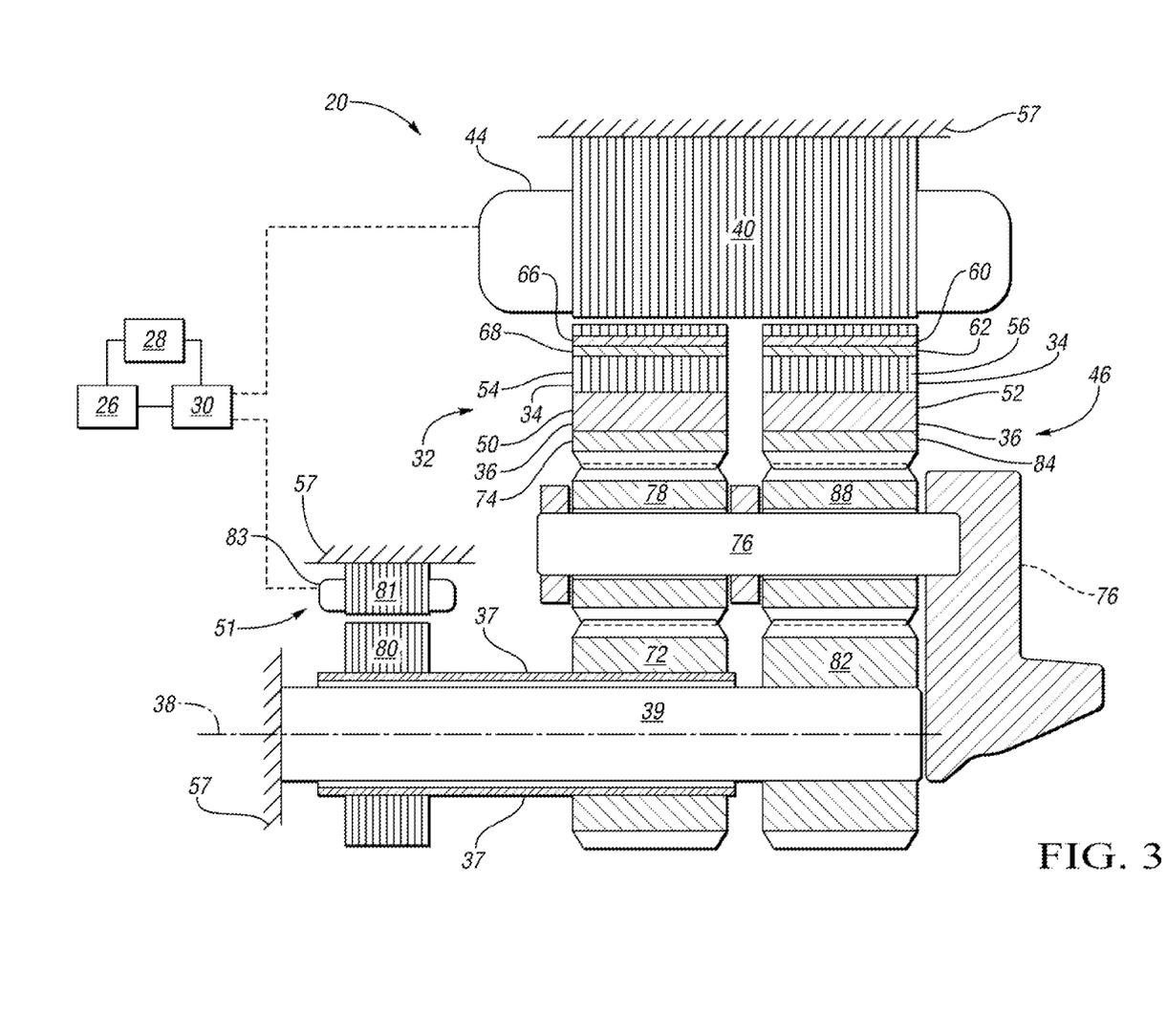
FIG. 3 is a schematic cross-sectional illustration of a portion of the electric motor assembly of FIGS. 1 and 2 showing one embodiment of a phaser actuator and a phaser gear mechanism.

Referring to FIG. 3, the motor/generator 20 is shown in greater detail. In the embodiment shown, the rotor hub 36 includes a first rotor hub portion 50 and a second rotor hub portion 52. The rotor 34 includes a first rotor portion 54 supported for rotation with the first rotor hub portion 50, and a second rotor portion 56 supported for rotation with the second rotor hub portion 52. The rotor portions 54, 56 are also referred to herein as rotor segments. The rotor portions 54, 56 and the hub portions 50, 52 are slightly axially spaced from one another. The rotor portions 54, 56 are operatively connected through a phaser that includes a phaser gear mechanism 46 and a phaser actuator 51. The rotor portions 54, 56 and can be adjusted angularly relative to one another by the phaser actuator 51, as further described herein. As used herein, a "phaser gear mechanism" can be any mechanism configured to establish a difference in angular position between two components of the mechanism. In the embodiments shown herein, and as further discussed below, the phaser gear mechanism 46 is a parallel pair of speed reduction gear sets. In the embodiments shown herein, the phaser actuator 51, 251 is an electric motor. In other embodiments, the phaser actuator 51 or 251 could be a hydraulic motor or other type of actuator.

Figure 2:
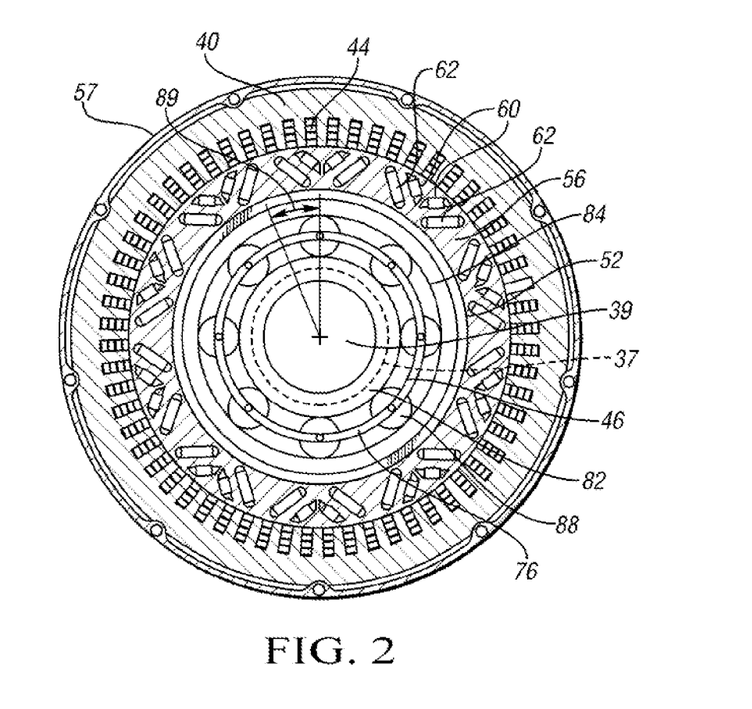
FIG. 2 is a schematic illustration in end view of the electric motor assembly of FIG. 1 with an end cover removed.

As shown in FIG. 2, in which an end cover 58 (see FIG. 2) of the motor/generator 20 is removed, the rotor portion 56 has a set of magnets 60, 62 distributed about its circumference. The set of magnets 60, 62 is referred to herein as a first or a second set of magnets. Current running through the windings 44 of the stator 40 creates a magnetic force alternately attracting and repelling the magnets 60, 62. The magnetic force creates a torque to turn the rotor portion 56. An additional set of magnets 66, 68 shown in FIG. 3 is distributed about the circumference of rotor portion 54. The set of magnets 66, 68 is referred to herein as a second set of magnets (or as a first set of magnets if the set of magnets 60, 62 is referred to as a second set of magnets). The magnets 66, 68 are arranged relative to one another in the same skew pattern as the magnets 60, 62. Current running through the windings 44 of the stator 40 creates a magnetic force alternately attracting and repelling the magnets 66, 68. The magnetic force creates a torque to turn the rotor portion 54. Because the set of magnets 60, 62 is substantially identical to the set of magnets 66, 68, the current that runs through windings 44 causes the portions 54, 56 to rotate at the same speed, even though axially separated from one another.

The rotor assembly 32 is configured with a phaser actuator 51 and phaser gear mechanism 46 that allow rotor portion 54 to move about the axis of rotation 38 relative to the other rotor portion 56, thereby changing in angular position relative to rotor portion 56. The movement, also referred to as angular skewing or phasing, is accomplished by activation of the phaser actuator 51, which in this embodiment is accomplished by electric power flow determined by the controller 26. The phasing increases in magnitude as the speed of the rotor portions 54, 56 of the rotor assembly 32 increases. The increased skewing with increased rotor speed better reduces the back electromotive force that otherwise tends to increase with increasing rotor speed.

Figure 4:
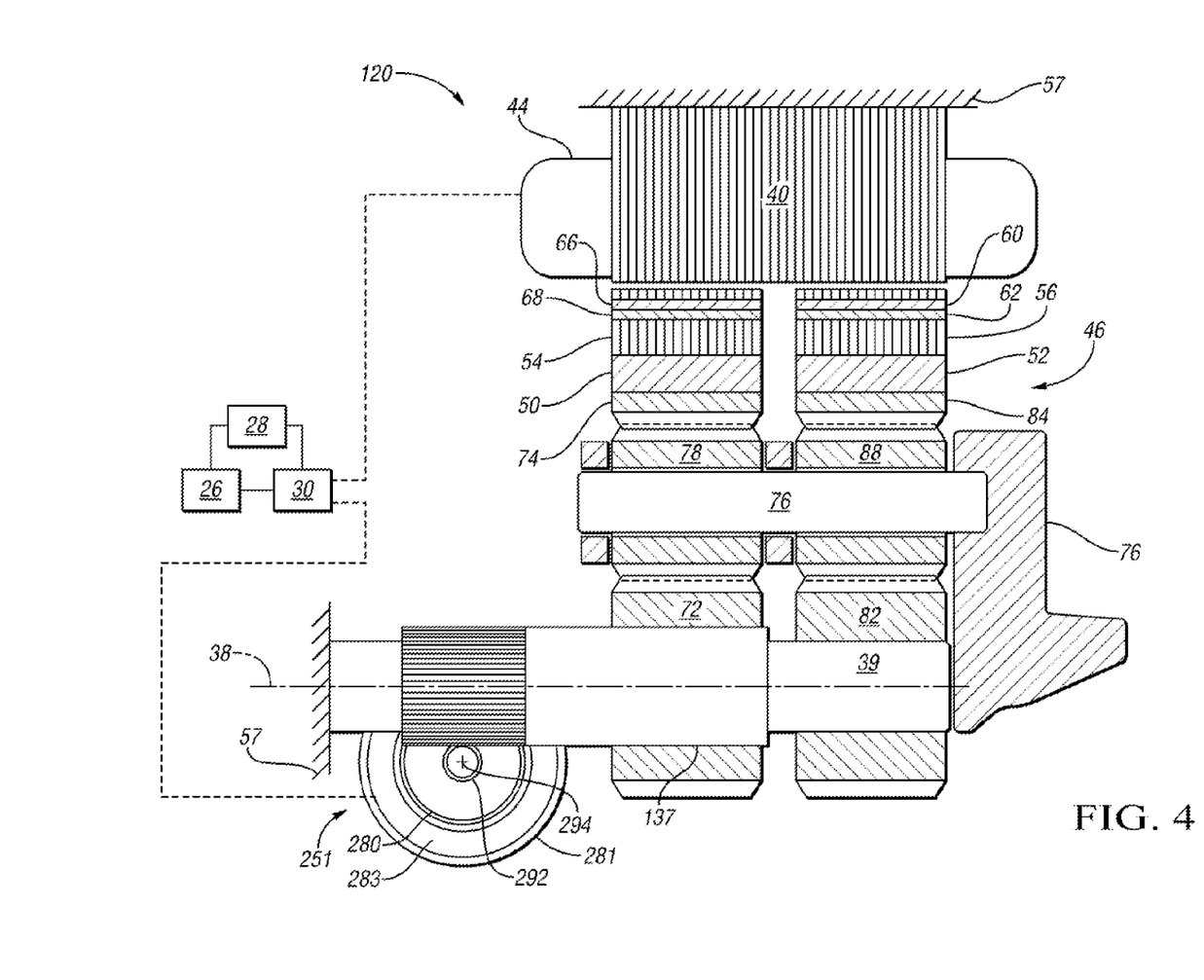
FIG. 4 is a schematic cross-sectional illustration of a portion of the electric motor assembly of FIGS. 1 and 2 with an alternative embodiment of a phaser actuator and a phaser gear mechanism.
Figure 5:
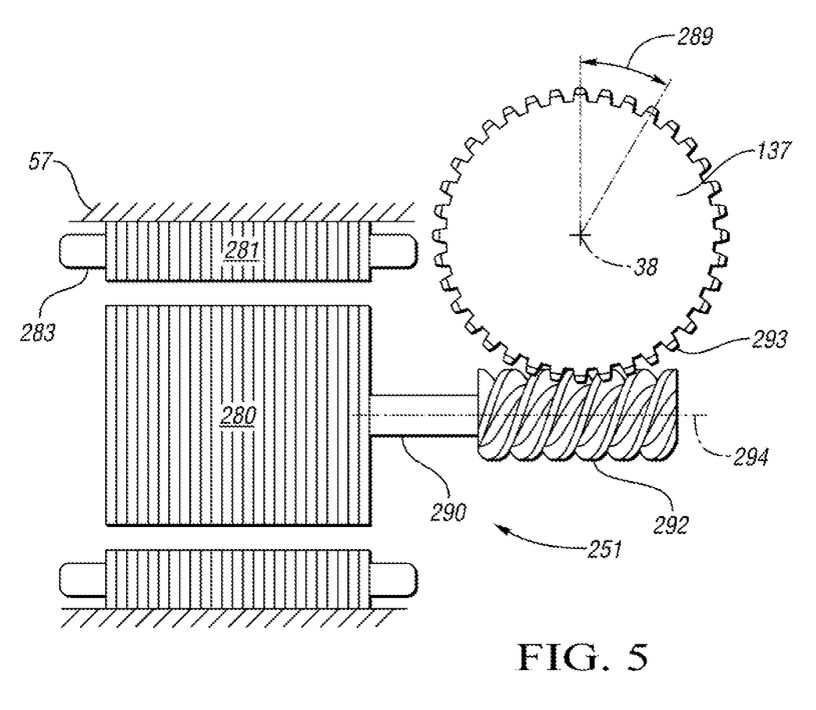
FIG. 5 is a fragmentary side view illustration of the phaser of FIG. 4.

In the embodiments shown in FIGS. 3-5, the relative movement occurs due to the phaser actuator 51 or 251 and the phaser gear mechanism 46. Specifically, referring to FIG. 3, the phaser actuator 51 has a phaser rotor 80 mounted to and concentrically surrounding a first shaft 37. The first shaft 37 is a sleeve shaft. A fixed shaft 39 is coaxial with the first shaft 37 and extends through the first shaft 37 to mount to the casing 57. The phaser actuator 51 has a phaser stator 81 that is mounted to the casing 57. Electrical windings 83 extend between two axial ends of the phaser stator 81. The electrical windings 83 are referred to herein as a second set of electrical windings. Power flows to the windings 83 from the battery 28 through the power inverter 30 as controlled by the controller 26 to activate the phaser actuator 51.

The phaser rotor 80 is operatively connected to the first rotor portion 54 and to the second rotor portion 56 through the phaser gear mechanism 46. The controller 26 monitors the speed of the rotor portions 54, 56 based on sensor signals or other data provided to the controller 26. The controller 26 is configured with a stored algorithm that determines an amount of angular movement of rotor portion 54 relative to rotor portion 56 that corresponds to a desired amount of reduction in back electromotive force for a given speed of the rotor portions 54, 56. The controller 26 is also configured to determine the amount of electric power to provide to the windings 83 in order to cause the desired amount of angular movement of the rotor 80 and the first shaft 37 connected thereto to and the corresponding movement of the rotor portion 54 to reduce back electromotive force.

The phaser gear mechanism 46 includes a plurality of members including a first sun gear member 72, a second sun gear member 82, a first ring gear member 74, and a second ring gear member 84. The first sun gear member 72 is fixedly mounted on the first shaft 37 to move commonly with the first shaft 37. The second sun gear member 82 is mounted on and fixed to a fixed shaft 39. The fixed shaft 39 is axially aligned with the first shaft 37 and is fixed to the stationary motor casing 57.

The members of the phaser gear mechanism 46 further include a carrier member 76, also referred to herein as the output member of the phaser motor/generator 20. In other embodiments, either of the ring gear members 74, 84 could instead serve as the output member of the motor/generator 20 by providing an appropriate hub portion extending outside of the casing 57 to provide torque to a member of the transmission 16.

The members of the phaser gear mechanism 46 also include a first set of pinion gears 78 rotatably supported by the carrier member 76 and meshing with the first sun gear member 72 and the first ring gear member 74, and a second set of pinion gears 88 rotatably supported by the carrier member 76 and meshing with the second sun gear member 82 and the second ring gear member 84. The first sun gear member 72, carrier member 76, and ring gear member 74 are a first gear set. The second sun gear member 82, the common carrier member 76 and the ring gear member 84 are a second gear set. Both gear sets are configured to reduce angular displacement from the sun gear members 72, 82 to the carrier member 76. The phaser gear mechanism 46 is thus a parallel pair of speed reduction gear sets with a variable position for one of the reaction members (the rotor portion 54).

When electric power flows to the windings 83 of the phaser stator 81, because the second sun gear member 82 is held stationary on the fixed shaft 39, the rotor portion 54 will change in angular position about the axis of rotation 38 relative to the rotor portion 56. Referring to FIG. 2, a change in angular position is represented as angle 89, and represents the amount of skewing that the rotor portion 54 and the magnets 66, 68 mounted thereon would experience relative to the rotor portion 56 and magnets 60, 62.

FIGS. 4 and 5 show a motor assembly 120 that is alike in all aspects to the motor assembly 20 except that a different phaser actuator 251 is used in place of phaser actuator 51 and the first shaft 37 is replaced with a modified first shaft 137 in light of the different configuration of the phaser actuator 251. Components that are the same as those of motor assembly 20 are indicated with the same reference numbers as used in FIG. 3. The description of these components with respect to FIG. 3 applies to FIGS. 4 and 5.

The phaser actuator 251 includes a phaser rotor 280 and a phaser stator 281 fixed to the motor casing 57 as shown in FIG. 5. Electrical windings 283 extend between two axial ends of the stator 281. The electrical windings 283 are referred to herein as a second set of electrical windings. Power flows to the windings 283 from the battery 28 through the power inverter 30 as controlled by the controller 26 to cause a change in angular position of the phaser rotor 280. A motor shaft 290 extends from and moves angularly with the phaser rotor 280. A worm 292 is mounted on the motor shaft 290 and also moves with the motor shaft 290 and the phaser rotor 280. The phaser rotor 280 is oriented generally perpendicular to the first shaft 137 on an axis 294 about which the phaser rotor 280 moves. The axis 294 is generally perpendicular to the axis 38 about which the rotor portions 54, 56 rotate.

The first shaft 137 includes a pinion gear 293 that is mounted to and moves with the first shaft 137. The first shaft 137 may have external teeth forming the pinion gear 293 so that the pinion gear 293 is integral with the first shaft 137. When the phaser rotor 280 moves, the worm 292 meshes with the pinion gear 293 and causes the angular position of the first shaft 137 to change, such as by angle 289 in FIG. 5. This in turn causes the rotor segment 54 to change in angular position and thereby be angularly offset from the rotor segment 56 to reduce back electromotive force.

The phaser actuator 251 is configured to lock to substantially prevent relative movement of the rotor portions 54, 56 when the phaser stator 280 is unpowered. By making the lead angle of the worm 292 relatively small, the worm 292 will resist back driving by forces borne on the shaft 137. The worm 292 will move to change angular position of the first shaft 137 only when the phaser stator 280 is powered.

Figure 6:
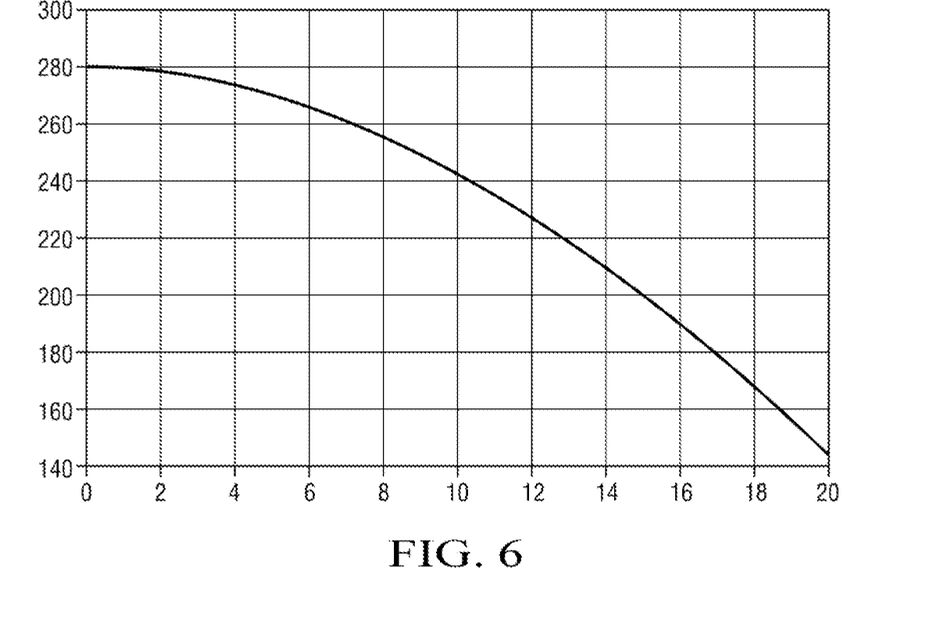
FIG. 6 is an exemplary illustration of back electromotive force versus skew angle for an electric motor assembly with phasing of rotor portions.
Figure 7:
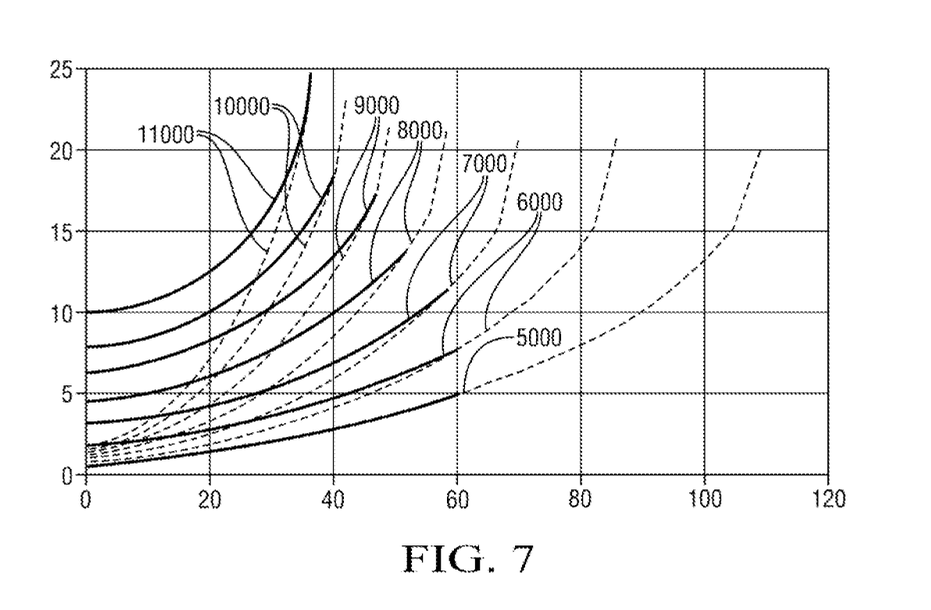
FIG. 7 is an exemplary illustration of a comparison of system power loss for an electric motor assembly versus torque loading with and without skewing of the rotor portions at various rotational speeds of the rotor portions.

FIG. 6 is an exemplary illustration of a potential reduction in back electromotive force, shown in volts on the vertical axis, and with various skewing, or phasing, amounts, shown in degrees on the horizontal axis, for a typical motor assembly at a rotation speed of the rotor. FIG. 7 is an exemplary illustration of system loss in watts, on the vertical axis, versus torque in newton-meters, on the horizontal axis, for various rotor speeds. The system loss without skewing is shown with solid lines for various motor speeds, and the system loss with skewing, or phasing, is shown with dotted lines for the same rotor speeds.

While the best modes for carrying out the invention have been described in detail, those familiar with the art to which this invention relates will recognize various alternative designs and embodiments for practicing the invention within the scope of the appended claims.

The invention claimed is:

1. An electric motor assembly comprising:
   a stator having a first set of electrical windings;
   a rotor assembly rotatable about an axis of rotation and having:
      a rotor having first and second rotor segments, each of the rotor segments having a respective set of magnets spaced therearound; and
      a phaser including a phaser actuator and a phaser gear mechanism;
   wherein the phaser gear mechanism has a plurality of members, wherein the phaser actuator and the first and second rotor segments are each operatively connected to a different respective one of the members; wherein the phaser actuator is activatable to cause a change in an angular position of one of the members thereby moving one of the rotor segments about the axis of rotation relative to the other of the rotor segments to reduce back electromotive force in the first set of stator windings; and wherein the phaser gear mechanism is configured as a parallel pair of speed reduction gear sets such that angular displacement is reduced through the phaser gear mechanism relative to the change in angular position of said one of the members.

2. The electric motor assembly of claim 1, wherein the phaser actuator has a phaser rotor and a phaser stator; wherein the phaser stator surrounds the phaser rotor and has a second set of electrical windings; wherein the change in angular position of the phaser actuator is a change in angular position of the phaser rotor; and wherein the phaser stator causes the change in an angular position of the phaser rotor when the second set of electrical windings is powered.

3. The electric motor assembly of claim 2, wherein the phaser rotor is mounted to and concentrically surrounds the first shaft.

4. The electric motor assembly of claim 2, further comprising:
a pinion gear operatively connected to the first shaft; and
wherein the phaser rotor is connected to and moves the pinion gear, thereby adjusting the angular position of the first shaft.

5. The motor assembly of claim 2, wherein the phaser actuator is configured to lock to substantially prevent movement of said one of the rotor segments when the phaser stator is not activated.

6. The electric motor assembly of claim 1, further comprising:
a motor casing;
a first shaft; wherein the phaser actuator is operatively connected to the first shaft to cause a change in angular position of the first shaft;
a second shaft grounded to the motor casing and axially aligned with the first shaft; and
wherein the members of the phaser gear mechanism include:
a first sun gear member mounted on and movable with the first shaft;
a second sun gear member mounted on the second shaft;
a first ring gear member mounted on and rotatable with the first rotor segment;
a second ring gear member mounted on and rotatable with the second rotor segment;
a carrier member;
a first set of pinion gears supported by the carrier member and meshing with the first sun gear member and the first ring gear member; and
a second set of pinion gears supported by the carrier member and meshing with the second sun gear member and the second ring gear member.

7. The electric motor assembly of claim 1, further comprising:
a rotor hub having first and second rotor hub portions; and
wherein the first rotor segment is supported for rotation with the first rotor hub portion and the second rotor segment is supported for rotation with the second rotor hub portion.

8. The electric motor of claim 1, further comprising:
a first shaft; wherein said one of the members of the phaser gear mechanism is fixed on the first shaft;
wherein the phaser actuator includes a worm that rotates when the phaser actuator is activated; wherein the first shaft has external teeth that mesh with the worm such that activation of the phaser causes the change in angular position of the first shaft via rotation of the worm.

9. A vehicle powertrain comprising:
an engine;
a transmission operatively connected to the engine and having at least one motor/generator; wherein the motor/generator includes:
a stator with electrical windings;
a rotor assembly rotatable about an axis of rotation and having:
a rotor hub with first and second rotor hub portions;
a rotor supported on the rotor hub, the rotor having a first rotor segment supported for rotation on the first rotor hub portion and a second rotor segment supported for rotation on the second rotor hub portion, each of the rotor segments having a respective set of magnets spaced therearound; wherein the sets of magnets cause the rotor assembly to rotate about the axis of rotation due to the current in the windings;
a phaser having a phaser actuator and a phaser gear mechanism having a plurality of members; wherein the phaser actuator and the first and second rotor segments are each connected to a different respective one of the members; wherein the phaser actuator is activatable to change an angular position of one of the members thereby moving one of the rotor segments about the axis of rotation relative to the other of the rotor segments; and
a controller configured to activate the phaser actuator in an increasing amount as speed of the rotor assembly increases, the relative movement of said one of the rotor segments thereby being an amount that increases as the speed of the rotor assembly increases, and the sets of magnets thereby being increasingly offset from one another as the speed of the rotor assembly increases to reduce back electromotive force acting against the current in the windings;
wherein the phaser actuator includes a phaser rotor and a phaser stator surrounding the phaser rotor; wherein the phaser rotor and phaser gear mechanism are operatively connected to at least one of the rotor segments and is operable to move said one of the rotor segments about the axis of rotation relative to the other of the rotor segments when the phaser stator is powered, movement of said one of the rotor segments increasing as power to the phaser stator increases;
a motor casing;
a first shaft; wherein the phaser rotor is operatively connected to the first shaft to cause a change in angular position of the first shaft;
a second shaft grounded to the motor casing and axially aligned with the first shaft;
wherein the members of the phaser gear mechanism include:
a first sun gear member mounted on and movable with the first shaft;
a second sun gear member mounted on the second shaft;
a first ring gear member mounted on and rotatable with the first rotor segment;
a second ring gear member mounted on and rotatable with the second rotor segment;
a carrier member;
a first set of pinion gears supported by the carrier member and meshing with the first sun gear member and the first ring gear member; and
a second set of pinion gears supported by the carrier member and meshing with the second sun gear member and the second ring gear member.

10. The vehicle powertrain of claim 9, wherein the phaser rotor is mounted to and concentrically surrounds the first shaft.

11. The vehicle powertrain of claim 9, further comprising:
a pinion gear operatively connected to the first shaft; and
wherein the phaser rotor is connected to and moves the pinion gear, thereby adjusting the angular position of the first shaft.

12. The vehicle powertrain of claim 9, wherein the phaser actuator is configured to lock to substantially prevent movement of said one of the rotor segments when the phaser stator is not activated.

13. The vehicle of claim 9, wherein the phaser actuator includes a worm that rotates when the phaser actuator is activated; wherein the first shaft has external teeth that mesh with the worm such that activation of the phaser causes the change in angular position of the first shaft via rotation of the worm.

14. An electric motor assembly comprising:
a stator having a first set of electrical windings;
a rotor assembly rotatable about an axis of rotation and having:
a rotor having first and second rotor segments, each of the rotor segments having a respective set of magnets spaced therearound; and
a phaser including a phaser actuator and a phaser gear mechanism;
wherein the phaser gear mechanism has a plurality of members, wherein the phaser actuator and the first and second rotor segments are each operatively connected to a different respective one of the members; wherein the phaser actuator is activatable to cause a change in an angular position of one of the members thereby moving one of the rotor segments about the axis of rotation relative to the other of the rotor segments to reduce back electromotive force in the first set of stator windings;
a motor casing;
a first shaft; wherein the phaser actuator is operatively connected to the first shaft to cause a change in angular position of the first shaft;
a second shaft grounded to the motor casing and axially aligned with the first shaft;
wherein the members of the phaser gear mechanism include:
a first sun gear member mounted on and movable with the first shaft;
a second sun gear member mounted on the second shaft;
a first ring gear member mounted on and rotatable with the first rotor segment;
a second ring gear member mounted on and rotatable with the second rotor segment;
a carrier member;
a first set of pinion gears supported by the carrier member and meshing with the first sun gear member and the first ring gear member; and
a second set of pinion gears supported by the carrier member and meshing with the second sun gear member and the second ring gear member.

15. The electric motor assembly of claim 14, wherein the phaser actuator has a phaser rotor and a phaser stator; wherein the phaser stator surrounds the phaser rotor and has a second set of electrical windings; and wherein the phaser stator causes a change in an angular position of the phaser rotor when the second set of electrical windings is powered.

16. The electric motor assembly of claim 15, further comprising:
a rotor hub having first and second rotor hub portions; and
wherein the first rotor segment is supported for rotation with the first rotor hub portion and the second rotor segment is supported for rotation with the second rotor hub portion.

17. The electric motor assembly of claim 15, wherein the phaser rotor is mounted to and concentrically surrounds the first shaft.

18. The electric motor assembly of claim 15, further comprising:
a pinion gear operatively connected to the first shaft; and
wherein the phaser rotor is connected to and moves the pinion gear, thereby adjusting the angular position of the first shaft.

19. The motor assembly of claim 15, wherein the phaser actuator is configured to lock to substantially prevent movement of said one of the rotor segments when the phaser stator is not activated.

* * * * *